United States Patent [19]
von Hoessle et al.

[11] Patent Number: 5,027,202
[45] Date of Patent: Jun. 25, 1991

[54] PICTURE TRANSMISSION SYSTEM OF OPTICAL WAVE GUIDE GUIDED MISSILES

[75] Inventors: Wolfgang von Hoessle, Hohenbrunn-Riemerling; Herbert Kuchler, Rosenheim, both of Fed. Rep. of Germany

[73] Assignee: Messerschmitt-Bolkow-Blohm GmbH, Fed. Rep. of Germany

[21] Appl. No.: 544,891

[22] Filed: Jun. 28, 1990

[30] Foreign Application Priority Data

Aug. 26, 1989 [DE] Fed. Rep. of Germany ....... 3928244

[51] Int. Cl.⁵ ..................... H04B 10/22; H04B 10/24; H04N 7/18
[52] U.S. Cl. .................................. 358/109; 350/437; 350/442; 350/445; 358/225; 370/4; 455/603
[58] Field of Search ............... 358/109, 180, 225, 209, 358/227, 229, 142; 250/330, 332; 350/437, 442, 445; 370/4; 455/603; 89/41.05

[56] References Cited

U.S. PATENT DOCUMENTS

| 3,469,260 | 9/1969 | Holt ..................................... 358/109 |
| 3,576,945 | 5/1971 | Ebeling ............................... 358/225 |
| 3,943,357 | 3/1976 | Culver ................................. 455/603 |
| 4,096,380 | 6/1978 | Eichweber ........................... 358/109 |
| 4,199,785 | 4/1980 | McCullough ....................... 358/180 |
| 4,405,943 | 9/1983 | Kanaly ................................ 358/109 |
| 4,695,892 | 9/1987 | Mary ................................... 358/225 |

FOREIGN PATENT DOCUMENTS 3146552 11/1983 Fed. Rep. of Germany.

Primary Examiner—Howard W. Britton
Attorney, Agent, or Firm—Evenson, Wands, Edwards, Lenahan & McKeown

[57] ABSTRACT

The invention relates to a picture transmission system of a guided missile which is connected with a ground facility by way of an optical wave guide. This system is arranged that, without any increase of the transmission band width of the optical wave guide, two TV pictures are transmitted to the ground guiding facility, in which case, in addition to the moving picture for the navigation of the guided missile, enlarged stationary pictures for a target identification may also be retrieved, without interfering with the picture-supported navigation. An embodiment is disclosed which includes a camera with a single fixed lens body containing a centrally disposed wide angle lens for sensing navigation aiding images and a surrounding longer focal distance lens for sensing target identification aiding images.

12 Claims, 2 Drawing Sheets

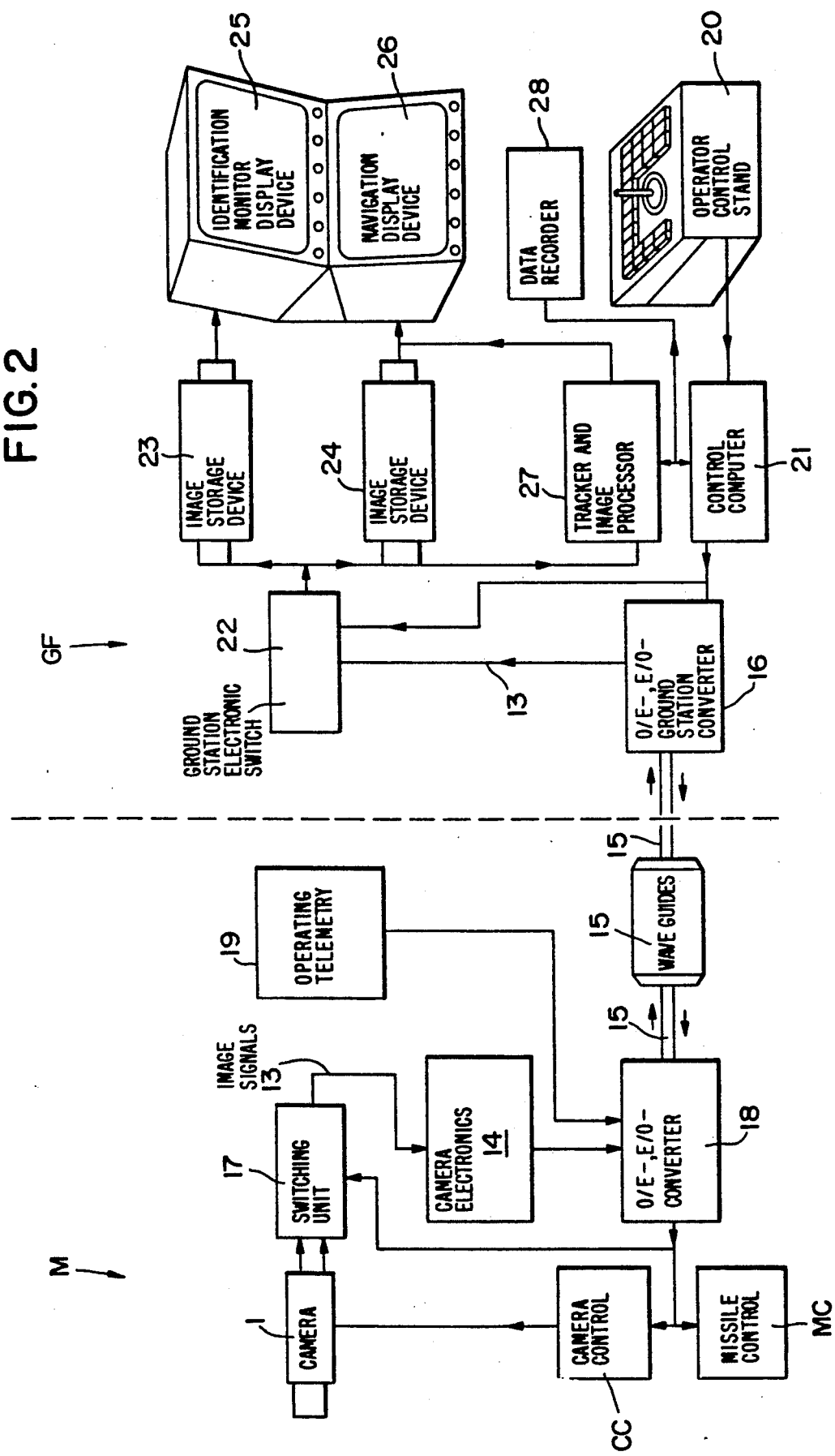

PICTURE TRANSMISSION SYSTEM OF OPTICAL WAVE GUIDE GUIDED MISSILES

BACKGROUND AND SUMMARY OF THE INVENTION

The invention relates to a picture transmission system of a guided missile which is connected with a ground facility by means of an optical wave guide.

In the case of guided missiles of this type, it is known to carry out a real-time picture transmission from a camera installed in the tip of the guided missile. As a result of the high band width by way of the optical wave guide, measured values of the instrumentation can at the same time be transmitted to the ground facility together with the picture data and, in the opposite direction, the necessary control and switching commands for the guiding of the guided missile can be transmitted from the ground. By means of the pictures of a TV-camera or an IR-camera, the missile-firing person can navigate the guided missile into a specific target area and he can also use the camera to detect existing targets, identify them and therefore attack them. Since it may be assumed that the flight into the target area takes place in the first instance according to map information and support by means of guided-missile gyroscopes, a lens coverage is required for orientation during navigation that is as large as possible, for it increases the chances of detecting clearly defined points in the terrain. Predominantly focal lengths of the lens of approximately 28 mm are to be suggested for this navigational task in the case of commercially available ⅔-inch CCD-arrays of the TV camera.

In contrast, for early target recognition and identification, the person firing the missile needs large focal length lenses—thus telephoto lenses—which, however, have a correspondingly smaller angular lens coverage. When the above-mentioned CCD-arrays are used, focal lengths of between 80 mm and 100 mm are recommended, because at larger focal lengths—for example, 200 mm and more—limits exist with respect to the stabilizing quality of the platform on which the camera is disposed.

On the basis of the German Published Examined Patent Application (DE-AS) 24 11 791, a picture transmission system of a guided missile is known which is connected by way of an optical wave guide with a ground facility and comprises a camera arranged in the tip of the guided missile which carries out a real-time picture transmission by way of the optical wave guide.

From the German Patent Document (DE) 31 46 552 C2, it is also known to transmit continuously to the ground facility two lens coverages as continuous pictures by means of two cameras of different focal lengths to which one picture array respectively is assigned. In this case a track window is faded into the center of the one lens coverage and, for purposes of identification, the track window is aimed at the point to be enlarged and the picture of this point is displayed on an identification monitor.

In the commonly owned pending German Patent Application (DE-OS) 39 27 334 (not prior art) the applicant suggested a real-time picture transmission device for a camera with two focal lengths in which the lens for the large focal length and the lens for the short focal length form a single structural element, and the change-over from one focal length to the other focal length takes place by means of the electronic system of the camera.

Thus, by means of the correspondingly designed camera with two focal lengths, the pictures are available simultaneously for the purpose of navigation as well as for the purpose of identification. It was found, however, that, for a simultaneous transmission of both pictures, the expenditures in the guided missile—which may be called a disposable or "lost missile"—are very high. Thus, at least two electronic systems for the camera are required, as well as a supplementary electronic system which "nests" the line information of both arrays in one another with a double frequency, and the double frequency is also needed for the transmission by way of the optical wave guide to the ground.

It is an object of the present invention to provide, based on the picture transmission system of the above-noted '334 application, a system which no longer requires these expenditures and nevertheless meets all tactical requirements, such as fast change-over times, high pivoting speed of the camera and large pivoting angles and, at the same time, saves space and weight and increases the overall efficiency of the system.

This object is achieved by providing a visual image transmission system for a guided missile which is connected with a ground facility comprising:

- a camera disposable in a guided missile and having a first lens of short focal length for sensing navigation aiding images and a second lens of long focal length for sensing target identification aiding images,
- a navigational visual display device at a ground facility,
- a target identification visual display device at the ground facility,
- and optical wave guide and electro-optical transmitting means for transmitting the visual image from the first lens to the navigational visual display device and for transmitting the visual image from the second lens to the target identification visual display device,
- wherein means are provided for selectively displaying the target identification image as a still picture on the target identification visual display device without impairing continuous viewing of the navigational aiding images on the navigational visual display device.

In especially preferred embodiments of the invention, the two lenses are constructed as composite fixed focal length lens where the short focal length lens is disposed in the center of the long focal length lens.

According to especially preferred embodiments, a camera optical wave guide is used to transmit the images from both lenses as well as control signals for controlling the missile. In preferred operational modes, the identification picture is transmitted for short periods while interrupting the navigational picture, without disrupting the missile operators continuous perception of the movng navigational images. Other objects, advantages and novel features of the present invention will become apparent from the following detailed description of the invention when considered in conjunction with the accompanying drawings.

BRIEF DESCRIPTION OF THE DRAWINGS

FIG. 2 is a schematic representation of a block diagram of a picture transmission system and of a ground guiding station, constructed in accordance with a preferred embodiment of the present invention.

DETAILED DESCRIPTION OF THE DRAWINGS

Figure 1:
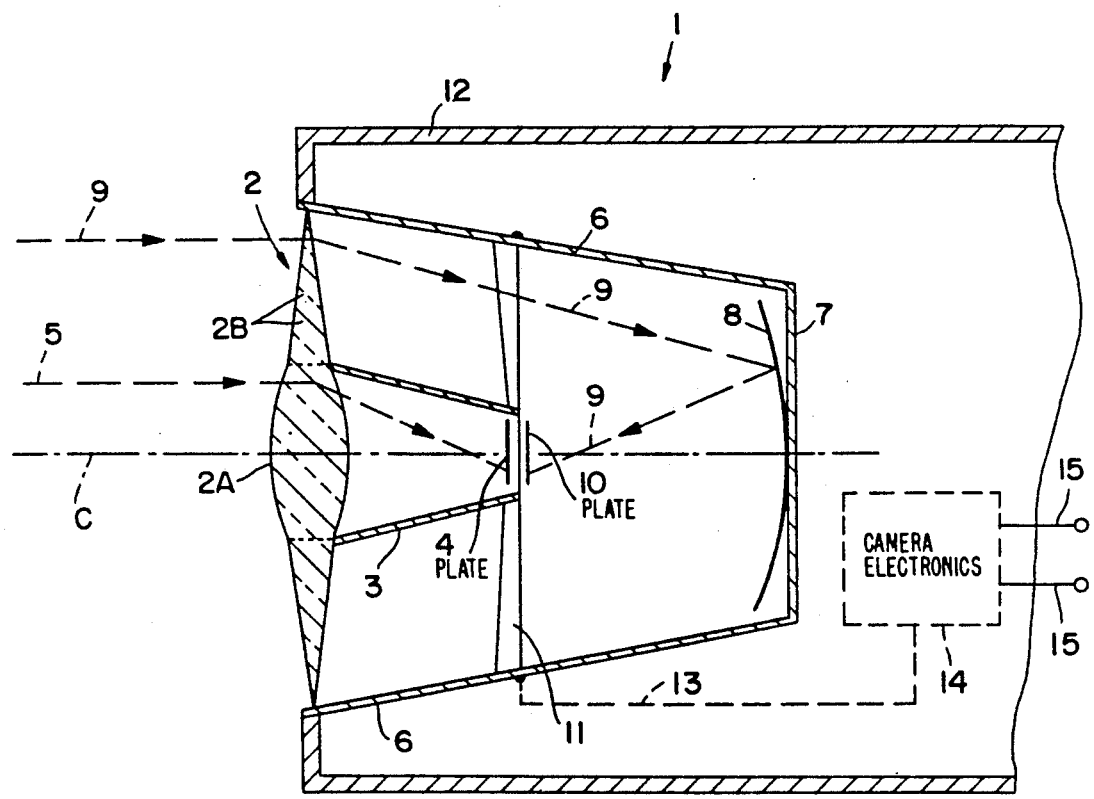
FIG. 1 is a schematic representation of a camera with a lens system with two focal lengths, constructed in accordance with a preferred embodiment of the present invention.

FIG. 1 schematically shows the optical parts of a camera 1 with a composite two focal length lens in a schematic representation. The camera 1 includes a lens 2 which has a first lens part 2A of short focal length and a second lens part 2B of longer focal length. A first camera housing 3 is conically tapered from the lens part 2A and houses at its end wall a first image collector plate 4 for collecting images corresponding to target identification images 5. A second camera housing 6 surrounds the entire lens 2 and is conically tapered toward a rear end wall 7 which supports a mirror 8. The mirror 8 operates to reflect images 9 corresponding to target identification images, which images 9 are in turn reflected to the second image collecting plate 10 arranged at the rear side of the housing 3 and facing oppositely of the image collecting plate 4. Housing 3 is supported centrally inside of the housing 6 by way of connecting webs 11 which are configured so as not to unduly interrupt the passage of the images 9 to the mirror 8.

Electro-optical signals depicted by line 13 are supplied to the camera-electronic control unit 14, and the signals corresponding to the images collected at plates 4 and 10 are transmitted by the schematically depicted optical wave guide 15 to a ground station via electrical-/optical-optical/electrical converters 8 and 16 (see FIG. 2).

FIG. 2 schematically depicts construction of the entire system including the missile mounted system M, depicted to the left of the vertical-dashed line in FIG. 2 and the ground facility GF depicted to the right of the vertical-dashed line in FIG. 2.

Referring to FIG. 2, left-hand side, the camera 1 is schematically depicted as providing signals to a switching unit 17, having an output 13 corresponding to the image signals, which is fed to the camera electronics 14, and subsequently via a converter 18 and wave guides 15 to a ground station converter 16. Operating telemetry is schematically depicted at 19 in FIG. 2 as an, input signal into the converter 18 to be transmitted to the ground station as well, which in turn provides signals for the missile control MC, and the camera control CC, which controls control the movement of the missile and the movement of the camera within the missile.

Referring to the right-side of FIG. 2 showing the ground facility GF, there is illustrated an operator control stand 20, which provides an output signal to a guidance control computer 21, which in turns feeds the converter 16 for feeding signals back to the missile system M, via the wave guide system 15. The converter 16 feeds the image signals 13 to a ground station electronic switch 22, which in turn is connected to a pair of image storage devices 23 and 24. The image storage device 23 stores the identification image and feeds the same to the identification monitor display device 25.

The image storage device 24 feeds a signal to the navigation display device 26 which provides for a continuous moving navigation picture. The image signal from the control 22 is also fed to a tracker and image processor 27, which in turn is connected with the guidance control computer 21 and a data recorder 28 which records and stores data, including the image data from the missile mounted camera system.

The embodiment described below is based on the consideration that, during the flight of the guided missile, the navigational lens coverage collected at plate 4, corresponding to the lens part with the short focal length of the camera 1, is always available to the ground facility at monitor 26 tracker 27 and guidance and control computer 21. For examining undefined objects detected in the picture, an individual picture of the corresponding object is now, in addition, retrieved by way of the lens part 2B with the large focal length and is displayed on an identification monitor 25 in the ground facility. In this case, the "fetching" of the object and the switch-back to the large navigational lens coverage must be capable of being carried out fast so that the guiding operation is not disturbed or impaired and the overall view is not lost.

In this case, the advantage is demonstrated of lens conceptions with fixed focal distances suggested by the applicant in contrast to so-called zoom lenses which require too much time for the corresponding adjustment. Such zoom lens particularly cannot examine several undefined objects in an optimally short time period because, as a result of the narrow camera coverage, a change of location for finding the next point is difficult because, for the searching, the zoom usually has to be moved back and must then be moved out again and must be switched to the other array.

Since the optical axes of both lens systems 2A and 2B of the camera 1 with two focal distances coincide and were therefore harmonized as a result of manufacturing, the enlarging identification viewing window is disposed in the center of the large navigational viewing window. This is also the area in which the tracking window of the target tracker is faded in.

Thus, for the identification of an object, the person firing the missile must aim the camera axis or the tracking window at the point to, be enlarged, and press a switchover key initializing electronic switches 17 and 22. The enlarged picture will appear within approximately 40 ms on the identification monitor 25 of the ground facility. Only these 40 ms—which are hardly discernable by the human eye—interrupt the observation of the navigational lens coverage on the monitor 26 of the person firing the missile which, after these 40 ms, will reappear automatically or by means of another actuating of the switchover key. However, the camera axis C remains in the direction on which a bearing was taken and would have to be guided back to the starting position either manually or automatically.

In the case of this identification method, the large navigational lens coverage is continuously displayed on the monitor 26 of the person firing the missile, and the identification window 25, when it is retrieved—thus at the time of the switchover—as a stationary individual picture, is displayed next to it or above it on a second monitor, the so-called identification monitor 25. In this case, the person firing the missile can keep the overall situation in his angle of vision at any time even when he is analyzing the object, on which the bearing is taken, on the stationary picture. This analysis or the identification may also be carried out by a second person.

Since studies have determined that moving pictures are not required for the identification of objects, but that a stationary picture is completely sufficient, the above-suggested embodiment must be considered to be optimal. Since the transmission of the navigational lens coverage is interrupted for only 40 ms for two split fields, and this interruption, as it were, coincides with the key pressure for retrieving the identification picture, the short perception of this interruption at the same time represents an operational actuating of the apparatus for the person firing the missile.

The retrieved individual picture of the identification window is loaded into a stationary-picture storage device 23 of the ground facility and, from there, is displayed on the identification monitor 25 for so long until, by means of taking a bearing on and a switchover to a new object, the next identification picture is transmitted to the ground in the stationary-picture storage device 23. The expenditures required for this embodiment of navigation with a moving picture and identification of objects by means of an additional stationary or individual picture consist only of an additional monitor and a stationary-picture storage device of a magnitude for a European standard size pc board in the ground facility.

In the case of the guided missile guided by optical wave guides, the picture data are used for guiding and controlling and for target tracking during the final approach. In general, at the time of the switchover to another viewing window, the changed enlargement ratios would therefore have to be taken into account in the control law. In the above-described solution, in which only an individual picture of the enlarged identification window is transmitted, the adaptation of the computing factors is not necessary because, in the present case, only the moving picture of the large navigational lens coverage is used for the guiding.

The shown embodiment may be expanded by arranging at the identification monitor or at the guiding station, a device for a signal display, such as a red/green display, which indicates whether the object on which the bearing is taken can still be approached by the guided missile or whether it has already been passed—for example, as a result of an excessive duration of identification. The ground facility can derive the data for this automatic display from the position of the camera axis and the angular rotation at the point in time of the request for the identification picture and from the time that has passed since then.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A visual image transmission system for a guided missile which is connected with a ground facility comprising:
    a camera disposable in a guided missile and having a first lens of short focal length for sensing navigation aiding images and a second lens of long focal length for sensing target identification aiding images,
    a navigational visual display device at a ground facility,
    a target identification visual display device at the ground facility,
    and optical wave guide and electro-optical transmitting means for transmitting the visual image from the first lens to the navigational visual display device and for transmitting the visual image from the second lens to the target identification visual display device,
    wherein means are provided for selectively displaying the target identification image as a still picture on the target identification visual display device without impairing continuous viewing of the navigational aiding images on the navigational visual display device.

2. A system according to claim 1, wherein the first and second lenses are constructed as a composite fixed focal length lens.

3. A system according to claim 2, wherein the first lens is disposed in the center of the fixed lens and the second lens surrounds the first lens.

4. A system according to claim 2, wherein the first lens is housed in a first lens housing which has an end wall supporting a first image receiving surface facing the first lens for receiving navigational aiding images, and wherein an opposite side of said end wall supports a second image receiving surface facing a mirror which reflects target identification images from the second lens.

5. A system according to claim 4, wherein the images at both said first and second image receiving surfaces are transmitted to the display devices by a common optical wave guide.

6. A system according to claim 5, wherein said common optical wave guide further carries missile control signals from the ground facility to the missile.

7. A system according to claim 1, wherein the navigational aiding images are displayed as moving images and the target identification images are displayed as stationary images.

8. A system according to claim 7, wherein, during showing of the identification image on the target identification visual display device, the navigation aiding images are continuously displayed on the navigational visual display device.

9. A system according to claim 7, wherein a fixed image storage device is provided for storing respective target identification aiding images and supplying them to the target identification visual display device during time periods intermediate respective update of the target identification image by a missile operator at the ground facility.

10. A system according to claim 7, wherein a signal display is assigned to the target identification visual display device, the signal of which signal display is determined by a computer of the ground facility from the position of the camera axis and the angular rotation at the point in time of a request for an identification picture and the flight time of the guided missile that has passed since then.

11. A system according to claim 7, wherein the transmission of the navigational aiding images is interrupted for a short time during transmission of the target identification aiding images.

12. A system according to claim 11, wherein said short time is approximately in the range of 40 ms.

* * * * *